(12) United States Patent
Gordon et al.

(10) Patent No.: US 9,863,776 B2
(45) Date of Patent: *Jan. 9, 2018

(54) AMBULATORY ROUTE MANAGEMENT BASED ON A PERSONAL DRONE

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Peter K. Malkin, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,856

(22) Filed: Mar. 8, 2017

(65) Prior Publication Data

US 2017/0176194 A1    Jun. 22, 2017

Related U.S. Application Data

(63) Continuation of application No. 14/798,695, filed on Jul. 14, 2015, now Pat. No. 9,659,503.

(51) Int. Cl.
*G01C 21/34* (2006.01)
*B64C 39/02* (2006.01)

(52) U.S. Cl.
CPC ........ *G01C 21/3407* (2013.01); *B64C 39/024* (2013.01); *G01C 21/3461* (2013.01);
(Continued)

(58) Field of Classification Search
CPC ............ G01C 21/3407; G01C 21/3461; G01C 21/3492; B64C 39/024; B64C 2201/12; B64C 2201/146
See application file for complete search history.

(56) References Cited

U.S. PATENT DOCUMENTS 7,237,750 B2 * 7/2007 Chiu ...................... A45C 13/02
                                                    244/119
8,639,396 B1 * 1/2014 Hirsch ................. G08G 5/0008
                                                     244/76 R (Continued)

OTHER PUBLICATIONS

List of IBM Patents or Patent Applictions Treated As Related; (Appendix P), Filed Feb. 1, 2016, 2 pages.

(Continued)

*Primary Examiner* — Calvin Cheung
(74) *Attorney, Agent, or Firm* — Cantor Colburn LLP; Vazken Alexanian

(57) ABSTRACT

Embodiments include method, systems and computer program products for route planning and management with a drone. Aspects include receiving a destination for an individual and determining multiple routes between a position of the individual and the destination. Aspects further include deploying the drone to determine safety and accessibility risks associated with the multiple routes and determining a preferred route from the multiple routes based on the safety and accessibility risks associated with the multiple routes.

14 Claims, 3 Drawing Sheets

(52) U.S. Cl.
CPC ...... *G01C 21/3492* (2013.01); *B64C 2201/12* (2013.01); *B64C 2201/146* (2013.01)

(56) References Cited

U.S. PATENT DOCUMENTS

| | | | | |
|---|---|---|---|---|
| 8,930,044 | B1* | 1/2015 | Peeters | 701/2 |
| 9,170,117 | B1* | 10/2015 | Abuelsaad | G01C 21/34 |
| 9,534,917 | B2* | 1/2017 | Abuelsaad | G01C 21/34 |
| 2010/0042269 | A1* | 2/2010 | Kokkeby | G01S 3/7864 |
| | | | | 701/3 |
| 2010/0087980 | A1* | 4/2010 | Spura | H04B 7/18504 |
| | | | | 701/24 |
| 2014/0022051 | A1* | 1/2014 | Levien | G05D 1/0011 |
| | | | | 340/5.2 |
| 2014/0257595 | A1* | 9/2014 | Tillmann | G01C 11/06 |
| | | | | 701/2 |
| 2015/0134143 | A1* | 5/2015 | Willenborg | G05D 1/0094 |
| | | | | 701/2 |
| 2015/0321758 | A1* | 11/2015 | Sarna, II | B64C 39/024 |
| | | | | 244/63 |
| 2015/0339919 | A1* | 11/2015 | Barnett | G08G 1/0116 |
| | | | | 340/907 |
| 2016/0068264 | A1* | 3/2016 | Ganesh | G08G 5/0069 |
| | | | | 701/2 |
| 2016/0078759 | A1* | 3/2016 | Nerayoff | G06Q 20/145 |
| | | | | 701/3 |
| 2016/0086494 | A1* | 3/2016 | Anandayuvaraj | G08G 5/0039 |
| | | | | 701/3 |
| 2016/0112864 | A1* | 4/2016 | Harber | H04W 4/028 |
| | | | | 455/432.3 |
| 2016/0129999 | A1* | 5/2016 | Mays | B64C 39/024 |
| | | | | 701/2 |
| 2016/0196753 | A1* | 7/2016 | Jarrell | G08G 5/0069 |
| | | | | 701/16 |
| 2016/0304217 | A1* | 10/2016 | Fisher | B60L 11/1809 |

OTHER PUBLICATIONS

Michael S. Gordon, et al., Pending U.S. Appl. No. 14/798,695 entitled "Ambulatory Route Management Based on a Personal Drone," filed Jul. 14, 2015.

Michael S. Gordon, et al., Pending U.S. Appl. No. 14/967,673 entitled "Ambulatory Route Management Based on a Personal Drone," filed Dec. 14, 2015.

* cited by examiner

AMBULATORY ROUTE MANAGEMENT BASED ON A PERSONAL DRONE

DOMESTIC PRIORITY

This application is a continuation of U.S. Pat. No. 9,659,503, filed Jul. 14, 2015, the contents of which in its entirety are incorporated herein by reference.

BACKGROUND

The present disclosure relates to ambulatory route management, and more specifically, to methods, systems and computer program products for route planning and management based on reconnaissance performed by a personal drone.

In general, individuals with ambulatory impairments or ambulatory disability have a physical condition that makes moving from place to place difficult. Often these individuals rely on a mobility device to assist them in moving from place to place. Mobility devices can include, but are not limited to, a cane or walking stick, a walker, a wheelchair, and a motorized wheelchair or scooter. While the use of mobility devices make moving from place to place easier on an individual, the use of the mobility devices may present impediments that can require the individual to take a different route than the user may otherwise select. For example, a user of a wheelchair may take a longer route from an origin to a destination in order to avoid stairs or a steep grade that would be difficult for the individual to traverse in the wheelchair.

Additionally, in many cases individuals are not aware of potential impediments along a route until they are actually encountered. This results in the individual having to take an unnecessarily circuitous route to get to their desired location, which is not ideal for individuals with ambulatory impairments or disabilities.

SUMMARY

In accordance with an embodiment, a method for route planning and management with a drone is provided. The method includes receiving a destination for an individual and determining multiple routes between a position of the individual and the destination. The method also includes deploying the drone to determine safety and accessibility risks associated with the multiple routes and determining a preferred route from the multiple routes based on the safety and accessibility risks associated with the multiple routes.

In accordance with another embodiment, a system for route planning and management with a drone includes a processor disposed in a mobile device, the processor being configured to perform a method. The method includes receiving a destination for an individual and determining multiple routes between a position of the individual and the destination. The method also includes deploying the drone to determine safety and accessibility risks associated with the multiple routes and determining a preferred route from the multiple routes based on the safety and accessibility risks associated with the multiple routes.

In accordance with a further embodiment, a computer program product for route planning and management with a drone includes a non-transitory storage medium readable by a processing circuit and storing instructions for execution by the processing circuit for performing a method. The method receiving a destination for an individual and determining multiple routes between a position of the individual and the destination. The method also includes deploying the drone to determine safety and accessibility risks associated with the multiple routes and determining a preferred route from the multiple routes based on the safety and accessibility risks associated with the multiple routes.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for route planning and management with a personal drone are provided. In exemplary embodiments, the personal drone is an unmanned aerial vehicle (UAV) that can be remotely controlled by a user to survey one or more potential routes for the individual and to convey information regarding the one or more routes to the user. In exemplary embodiments, the information regarding the routes includes safety and accessibility information for the route (e.g., whether a route has sidewalks, stairs, steep grades, or other impediments). In exemplary embodiments, the individual may use the information provided by the drone to plan a route that avoids safety and/or accessibility impediments. The route planning may be performed by a processing system disposed on the drone or by a mobile device of the individual that is configured to receive the safety and accessibility information from the drone.

Figure 1:
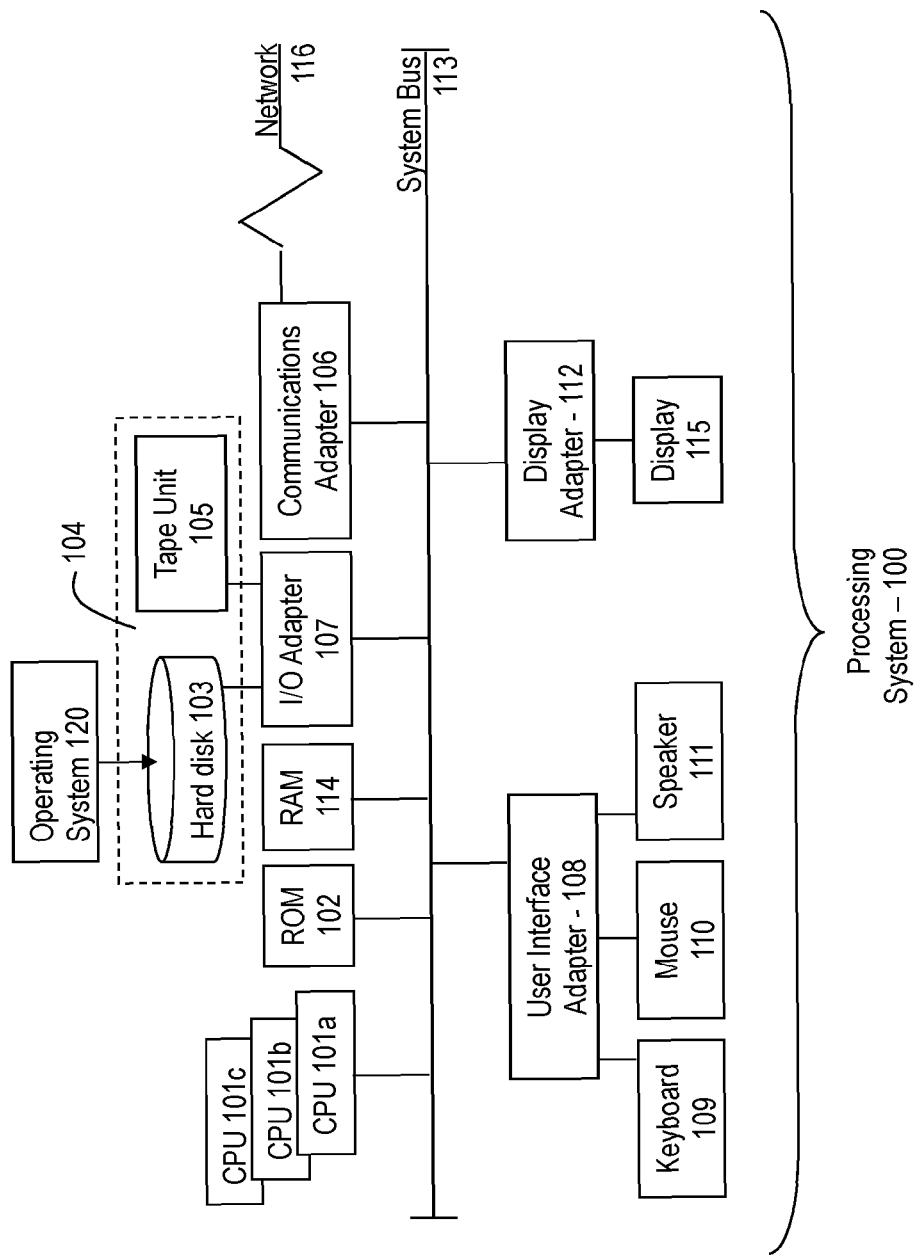
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor)

115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
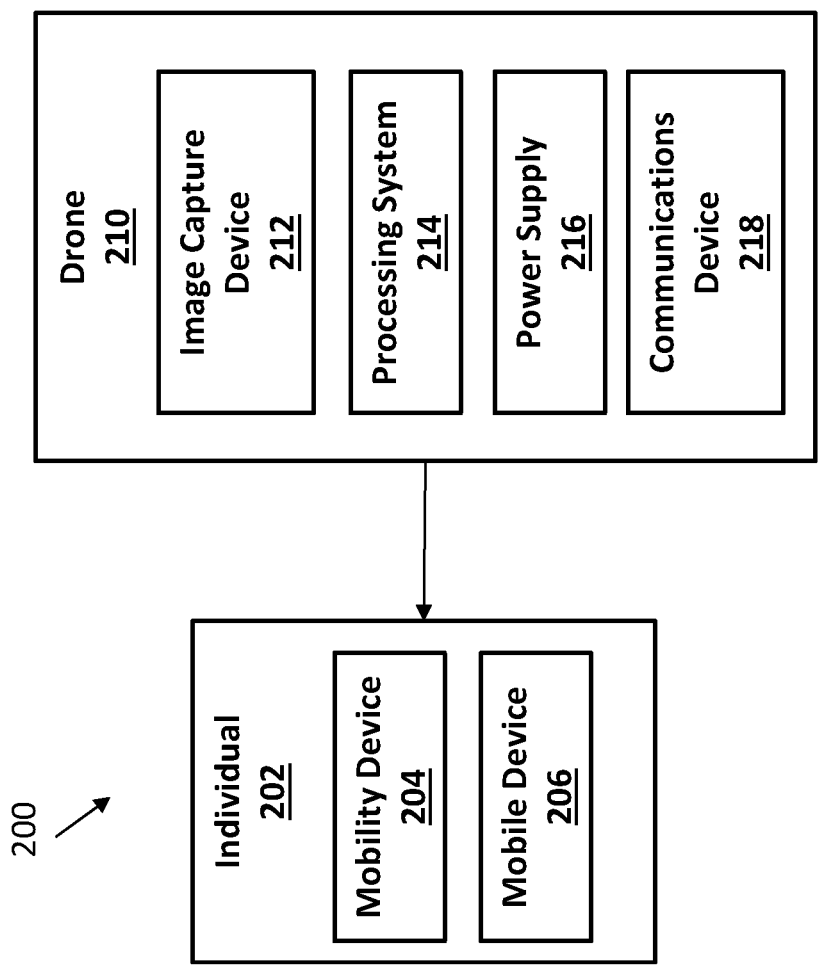
FIG. 2 is a block diagram illustrating a system for route planning and management with a personal drone in accordance with exemplary embodiments.

Referring now to FIG. 2, a system 200 for route planning and management with a personal drone in accordance with exemplary embodiment is shown. In exemplary embodiments, the system 200 includes an individual 202 that may be using a mobility device 204. In exemplary embodiments, the mobility device 202 may be, but is not limited to, a cane or walking stick, a walker, a wheelchair, and a motorized wheelchair or scooter. In addition, the individual 202 may also have a mobile device 206, such as a smartphone or tablet, which is configured to communicate with the drone 208. The mobile device 206 may include a processing system similar to the one shown in FIG. 1.

The system 200 also includes a drone 210 that is an unmanned aerial vehicle. In exemplary embodiments, the drone 210 may be remotely controlled by the individual 202 through a dedicated remote control (not shown) or by the mobile device 206. The drone 210 includes an image capture device 212, a processing system 214, a power supply 216, and a communications device 218. In exemplary embodiments, the image capture device 212 may be a camera, a video camera, or the like. The processing system 214 is configured to communicate with the image capture device 212 and to process information provided by the image capture device 212 to identify safety and environmental impediments. The safety and environmental impediments may include, but are not limited to, steps, holes, snow, ice, cracks in sidewalks, crowds, fire, smoke, or sun glare. In exemplary embodiments, the processing system 214 may include a processing system similar to the one shown in FIG. 1. The drone 202 is powered by a power supply 216 which may include a battery and one or more energy generation devices, such as a solar panel. In exemplary embodiments, the drone may be sensitive to signals such as from bus stop signs, crosswalk signs, etc.

In exemplary embodiments, the processing system 214 is configured to communicate with the individual via the communications device 218. In exemplary embodiments, the communications device 218 may include a transceiver configured to communicate with a remote control or with the mobile device 206. The communications device 218 may include an audio/video display that is used to communicate directly with the individual. For example, in embodiments where the drone 210 plans a route based on its observations and upon the destination set by the individual 202, the communications device 218 may include a speaker and/or video screen that are used to provide the individual 202 with routing directions. In various embodiments, the routing directions may be conveyed to the individual 202 via an audible indication, a tactile indication, a visual map, etc.

In exemplary embodiments, the drone 210 is configured to dock with the individual 202 via an attachment point. The attachment point may be disposed on the individual 202 or on the mobility device 204 of the individual. For example, the attachment point may be any of: a perch on the user's shoulder; a dock on a walking stick for the visually impaired; or a dock on a wheel chair. In exemplary embodiments, the drone 210 may be configured to charge and or transfer data while docked to the attachment point. The attachment point may include a docking surface, an orientation mechanism that adjusts the docking surface to provide a level docking area, and an alignment mechanism coupled with the docking surface that moves the drone slightly to a predetermined location on the docking surface for automated recharging and/or data transfer. In exemplary embodiments, a latching mechanism may secure the drone to the docking surface of the attachment point.

In exemplary embodiments, the drone 210 may be configured to receive information from a road guidance system for the blind, such as the system disclosed in United States Patent Application Publication No. 2013/0332018. For example, RFID tags can be buried inside a pedestrian pavement with information regarding the roads stored in the RFID tags. The communications device 218 of the drone 210 may include an RFID reader for checking signals of such RFID tags. Accordingly, the drone 210 may make it easier for blind or visually impaired people to access information regarding the roads that is usually made to public transportation users visually, through posters or informative signs, or through dynamic information screens.

In some embodiments, the drone 210 may convey information to the individual via a wearable tactile navigation system. The wearable tactile navigation system frees a user from requiring the use of her eyes as there is no display, and all positional information is conveyed via touch. For example, as with a compass, the device may "nudge" a user towards North. As a GPS navigator, coupled with information provided by the drone, the device orients a user towards a landmark (e.g., home) and lets the user feel how far away home is. One application of the system is as a wayfinding device for people that are blind and for people that suffer from Alzheimer's disease, but there are many other applications where it is desirable to provide geographical information from the drone in tactile form as opposed to providing it in visual or auditory form.

In exemplary embodiments, the drone 210 may recommend routes with reduced sun glare and avoid routes with low visibility (e.g., avoid areas with deep shadows). In addition, the drone 210 can be configured to scout for a preferred entry to a building given the needs of the individual (e.g., one with the fewest stairs, or an ADA-compliant entry). The drone 210 may also assess the steepness of a wheelchair ramp in deciding a preferred entry to a building. In exemplary embodiments, the mobile device 206 and/or the drone 210 may store a profile of the individual that includes medical information regarding the individual that affects the user's ambulatory ability. For example, the individual profile may indicate that the user can only traverse a maximum grade or a maximum number of steps or that the user has a visual or audio impairment.

In exemplary embodiments, the drone 210 is coupled to an ambulatory route planning system disposed in the mobile device 204. The route planning system may use GPS data, map data, traffic reports, and the individual profile in order to evaluate possible routes for the individual. The routes may be ranked, such that two (or more) routes require further drone 210 based discrimination in order to determine which to recommend to the individual. This assessment can then made by deploying the drone 210 to observe the routes. The drone 210 or the mobile device 206 may make the determination of the preferred route for the individual by measuring scene clutter and noise along each candidate route. As used herein, scene clutter includes obstructions, crowds, etc., along the route noise includes dangerous conditions such as traffic and construction, as well as fire. In an exemplary embodiment, a multidimensional discrimination analysis is performed on data collected for each the candidate routes and a recommendation is made.

Figure 3:
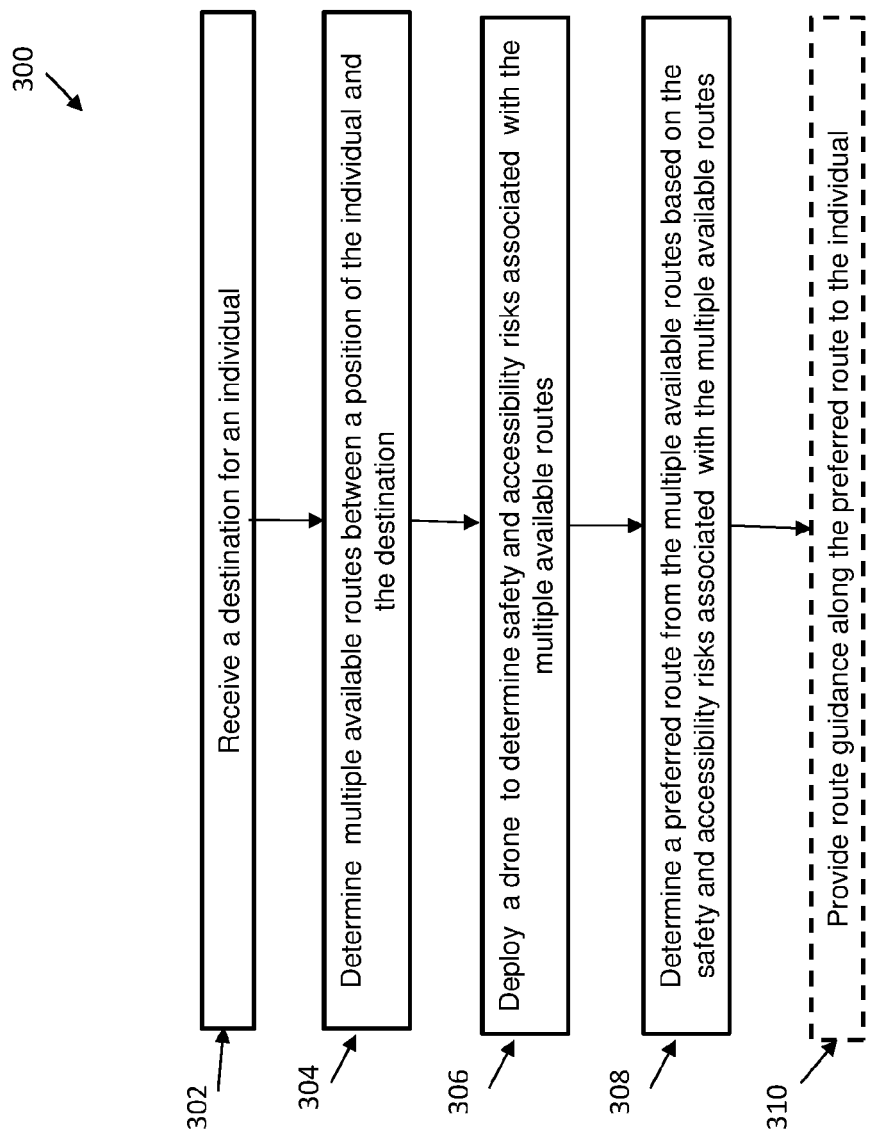
FIG. 3 is a flow diagram of a method for route planning and management with a personal drone in accordance with an exemplary embodiment.

Referring now to FIG. 3, a flow diagram of a method 300 for route planning and management with a personal drone in accordance with an exemplary embodiment is shown. As shown at block 302, the method 300 includes receiving a destination for an individual. Next, as shown at block 304, the method 300 includes determining multiple routes between a position of the individual and the destination. The method 300 also includes deploying a drone to determine safety and accessibility risks associated with the multiple routes, as shown at block 306. In exemplary embodiments, triggering of the drone to leave the individual to scout the routes may be manual or automatic (e.g., based on an estimate of likely risk). In exemplary embodiments, automatic triggering of the drone to leave the individual to scout the routes may be may take into consideration a profile of the individual (e.g., blind, Parkinson's, pre-Alzheimer's, elderly, child, etc.) In addition, the determination to automatically deploy the drone may be based on an estimate of likely risk along the multiple routes. The estimate of likely risk can be based on historical use of the route by the individual or from data about the routes received from other users in a crowd sourced information system.

Next, as shown at block 308, the method 300 includes determining a preferred route from the multiple routes based on the safety and accessibility risks associated with the multiple routes. In exemplary embodiments, the determination of the preferred route is further based on a profile of the individual, which includes medical information of the individual. In one embodiment, the drone may return to the individual to conveying such safety and accessibility risks to the individual prior to the determination of the preferred route. In another embodiment, the drone may wirelessly transmit the safety and accessibility risks to the individual prior to returning to the individual. As shown at block 310, the method 300 may optionally include providing route guidance along the preferred route to the individual. The route guidance may be provided via audio, visual, or tactile signals to the individual.

In exemplary embodiments, the safety and accessibility risks may include, but are not limited to, steps, holes, snow, ice, cracks in sidewalks, crowds, fire, smoke, or sun glare. Likewise, the safety and accessibility risks may include allergens, cigarette smoke, and triggers for phobias (such as heights, bridges, barking dogs, etc.). For disaster situations, such as forest, brush, and wild fires, safety and accessibility risks may include the location of fires and heavy smoke.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for route planning and management with a drone, the method comprising:
   receiving a destination for an individual;
   determining, by a processor, multiple routes between a position of the individual and the destination;
   deploying the drone to determine one or more of safety and accessibility risks associated with the multiple routes; and
   determining, by the processor, a preferred route from the multiple routes based on the safety and accessibility risks associated with the multiple routes, wherein the drone is configured to attach to one of the individual and a mobility device of the individual.

2. The method of claim 1, wherein the determination of the preferred route is further based on a profile of the individual that includes medical information of the individual.

3. The method of claim 2, wherein determining the one or more of safety and accessibility risks associated with the multiple routes includes the drone scouting for a preferred entry to a building given based on the profile of the individual.

4. The method of claim 1, wherein a determination to deploy the drone is automatic and is based on an estimate of likely risk along the multiple routes.

5. The method of claim 1, wherein the safety and accessibility risks include one or more of: steps, holes, snow, ice, cracks in sidewalks, crowds, fire, smoke, and sun glare.

6. A computer program product for route planning and management with a drone, the computer program product comprising:
   a non-transitory storage medium readable by a processing circuit and storing instructions for execution by the processing circuit for performing a method comprising:
   receiving a destination for an individual;
   determining multiple routes between a position of the individual and the destination;
   deploying the drone to determine one or more of safety and accessibility risks associated with the multiple routes; and
   determining a preferred route from the multiple routes based on the safety and accessibility risks associated with the multiple routes, wherein the drone is configured to attach to one of the individual and a mobility device of the individual.

7. The computer program product of claim 6, wherein the determination of the preferred route is further based on a profile of the individual that includes medical information of the individual.

8. The computer program product of claim 7, wherein determining the one or more of safety and accessibility risks associated with the multiple routes includes the drone scouting for a preferred entry to a building given based on the profile of the individual.

9. The computer program product of claim 6, wherein a determination to deploy the drone is automatic and is based on an estimate of likely risk along the multiple routes.

10. The computer program product of claim 6, wherein the safety and accessibility risks include one or more of: steps, holes, snow, ice, cracks in sidewalks, crowds, fire, smoke, and sun glare.

11. A system for route planning and management with a drone, comprising:
   a mobile device having processor in communication with the drone, the processor configured to:
   receive a destination for an individual;
   determine multiple routes between a position of the individual and the destination;
   deploy the drone to determine one or more of safety and accessibility risks associated with the multiple routes; and determine a preferred route from the multiple routes based on the safety and accessibility risks associated with the multiple routes, wherein the drone is configured to attach to one of the individual and a mobility device of the individual.

12. The system of claim 11, wherein the determination of the preferred route is further based on a profile of the individual that includes medical information of the individual.

13. The system of claim 11, wherein a determination to deploy the drone is automatic and is based on an estimate of likely risk along the multiple routes.

14. The system of claim 11, wherein the safety and accessibility risks include one or more of: steps, holes, snow, ice, cracks in sidewalks, crowds, fire, smoke, and sun glare.

* * * * *